United States Patent

Grabhofer et al.

[15] 3,635,715

[45] Jan. 18, 1972

[54] GELATINE-CONTAINING PHOTOGRAPHIC LAYERS WHICH HAVE IMPROVED PHYSICAL PROPERTIES

[72] Inventors: Herbert Grabhofer; Wolfgang Himmelmann, both of Koeln; Dieterich Glabisch, Opladen, all of Germany

[73] Assignee: Agfa-Gevaert Aktiengesellschaft, Leverkusen, Germany

[22] Filed: Oct. 28, 1969

[21] Appl. No.: 871,950

[30] Foreign Application Priority Data

Nov. 7, 1968 Germany.....................P 18 07 450.5

[52] U.S. Cl. ..............................96/87 R, 96/114, 96/114.4, 260/8
[51] Int. Cl. ...........................................................C08f 15/40
[58] Field of Search....................260/8; 96/114, 114.4, 87 R

[56] References Cited

UNITED STATES PATENTS

| | | | |
|---|---|---|---|
| 3,079,837 | 3/1963 | Theilemann | ..........................96/114 X |
| 3,488,708 | 1/1970 | Smith | ..................................96/114 X |

FOREIGN PATENTS OR APPLICATIONS 1,139,789  1/1969  Great Britain

*Primary Examiner*—Howard E. Schain
*Attorney*—Connolly and Hutz

[57] ABSTRACT

A photographic gelatine layer, which contains as plasticizer copolymers of (1) ethylene, (2) a half ester of an $\alpha,\beta$-unsaturated dicarboxylic acid, the alcohol component of which is preferably aliphatic or cycloaliphatic and which contains up to eight C-atoms, preferably maleic acid half esters, (3) vinyl chloride, and (4) a vinyl ester of saturated carboxylic, preferably an aliphatic carboxylic acid which has up to five C-atoms.

8 Claims, No Drawings

GELATINE-CONTAINING PHOTOGRAPHIC LAYERS WHICH HAVE IMPROVED PHYSICAL PROPERTIES

The invention relates to gelatine layers, particularly for use in photographic materials, the mechanical properties of which have been improved by the addition of aqueous dispersions of copolymers of ethylene, vinyl acetate, vinyl chloride and maleic acid half esters.

The hydrophilic protective colloid mostly used in photography for use in light-sensitive silver halide emulsions and in other auxiliary layers is gelatine. The physical properties of a gelatine layer such as its brittleness, elasticity and resistance to cold depend to a large extent on the atmospheric moisture. In a dry atmosphere, considerable tensile forces come into play which may cause distortion of the support. Gelatine-containing photographic emulsions which have been cast on triacetyl cellulose films break if they are very dry, and when they are subjected to bending. The break is propagated right through the gelatine layer and it often leads to a break in the support. There have, therefore, been a number of attempts to improve the mechanical properties of such layers, even under very dry conditions, by means of a gelatine plasticizer.

Hygroscopic substances such as alcohols or glycerol have been described as plasticizers but they impart a soft handle to the layers and, if the atmospheric moisture is very low, they make the gelatine layers even more fragile. The following compounds have, therefore, also been proposed for this purpose: amides of carboxylic acids or various copolymers, particularly of acrylic acid esters, acrylonitrile or acrylamide. All these products, however, have various disadvantages which are that the low molecular weight additives are washed out during processing and the plasticizing or softening effect is, therefore, lost, or that they cause clouding of the layers which impairs the photographic properties. The latter disadvantage applies particularly to high molecular weight plasticizers which are insoluble in water.

Dispersions of high molecular weight ionic polyurethanes have also been described as plasticizers for gelatine. These polyurethanes have, however, disadvantages in that they cause residues of developers to be retained in the layer. Moreover, plasticizers of this type are not sufficiently compatible with other additives such as color couplers.

It is an object of the invention to develop plasticizers for photographic layers which will be readily compatible with other additives and which do not shown any unwanted effects during processing of the exposed photographic material.

Softened gelatine layers, particularly photographic gelatine layers, have now been found which contain as plasticizers copolymers of (1) ethylene, (2) a half ester of an $\alpha,\beta$-unsaturated dicarboxylic acid, the alcohol component of which is preferably aliphatic or cycloaliphatic and which contains up to eight carbon atoms, preferably maleic acid half esters, (3) vinyl chloride, and (4) a vinyl ester of saturated carboxylic acid, preferably an aliphatic carboxylic acid which has up to five carbon atoms.

The composition of the copolymers may vary within wide limits. If the consistency is smooth and rubbery, the excellent effect is preserved. The following ranges are preferred:
9 to 30% by weight of ethylene,
2 to 12% by weight of dicarboxylic acid half ester,
90 to 58% by weight of a mixture of vinyl chloride and vinyl ester, the proportion of the latter in this mixture being 15 to 45 percent by weight.

The high molecular weight copolymers to be used according to the invention preferably have an average molecular weight of between 20,000 and 100,000. They are free from low molecular weight constituents, and they can be added directly, in the form of their aqueous dispersions, to the photographic emulsion, i.e., without dialysis and without washing. They consist of polymer lattices which have a particle size of less than 0.5 $\mu$.

These copolymers do not lower the sensitivity of the photographic layers and they do not impair the washing out of the developer during processing. The lattices do not contain any further wetting agents and they are readily compatible with anionic wetting agents.

The copolymers have a rubbery consistency. Their elastic properties can be used to advantage in photographic materials, particularly in color coupler combinations of silver halide gelatine layers. Another advantage in using the copolymers claimed is that the films lie flatter; this applies particularly to multilayered color films which curl up towards the emulsion side due to very high tensile forces. The rigid gelatine structure is loosened by the incorporation of the above-mentioned lattices and the tensile forces are reduced, which has an advantageous effect, particularly on the flat layers of cine films.

The following are examples of suitable copolymers:
Copolymer 1:
  18.2% by weight of vinyl acetate,
  63.2% by weight of vinyl chloride,
  15.3% by weight of ethylene,
  3.3% by weight of cyclohexyl half ester of maleic acid.
  $[\eta]$ (intrinsic viscosity measured in p-xylene at 25° C.) = 0.37.
  Particle size approximately 0.2 $\mu$m.
Copolymer 2:
  25% by weight of vinyl acetate,
  45% by weight of vinyl chloride,
  25% by weight of ethylene,
  5% by weight of cyclohexyl half ester of maleic acid.
    Latex solids content: 56.6 %.
    Particle size: less than 0.2 $\mu$.
Copolymer 3:
  19.9% by weight of vinyl acetate,
  55.9% by weight of vinyl chloride,
  21.3% by weight of ethylene,
  2.9% by weight of cyclohexyl half ester of maleic acid.
    Latex solids content: 58%.
    Particle size: less than 0.2 $\mu$.
Copolymer 4:
  21.8% by weight of vinyl acetate,
  55.9% by weight of vinyl chloride,
  18.7% by weight of ethylene,
  3.9% by weight of the cyclohexyl half ester of maleic acid.
    Latex solids content: 28.5 %.
    Particle size: less than 0.2 $\mu$.
Copolymer 5:
  19.8% by weight of vinyl acetate,
  56.5% by weight of vinyl chloride,
  20.7% by weight of ethylene,
  3.0% by weight of the cyclohexyl half ester of maleic acid.
    Latex solids content: 60.5 %.
Copolymer 6:
  32.6% by weight of vinyl acetate,
  47.5% by weight of vinyl chloride,
  14.0% by weight of ethylene,
  5.5% by weight of the cyclohexyl half ester of maleic acid.
    Latex solids content: 59%.

The copolymers to be used according to the invention may be prepared by known methods, e.g., by emulsion copolymerization either batchwise or continuously. The preparation of copolymer 1 is described below.
A mixture of:
  10 parts by weight of $KH_2PO_4$,
  128 parts by weight of a 23 percent aqueous solution of the ammonium salt of the cyclohexyl half ester of maleic acid,
  10 parts by weight of potassium peroxydisulfate, and
  1,372 parts by weight of distilled boiled water is introduced into a stainless steel, 3-liter, high-pressure autoclave with stirrer. After flushing the contents three times with ethylene at about 20 excess atmospheres,
  60 parts by weight of vinyl acetate and
  200 parts by weight of vinyl chloride are pumped in. The autoclave is heated to 70° C. and the pressure adjusted to 100 excess atmospheres using ethylene.
  30 parts by weight of vinyl acetate and
  100 parts by weight of vinyl chloride are pumped in after 1, 3 and 5 hours. The pressure is kept at 80 to 100 excess atmospheres by the addition of ethylene. The reaction mixture is cooled after 18 hours and 2,110 parts by weight of a 35.3 percent by weight emulsion, which is free from coagulate and has a pH value of 5, are obtained. Phase separation is accomplished within 48 hours by the addition of 0.3 percent by weight of ammonium alginate. A cream which has a solids content of 58 percent by weight is obtained.

To use the copolymer dispersions in accordance with the invention, the dispersion is added to the gelatine emulsions before casting. The additives are used in an amount of 0.05 to 1, preferably 0.1 to 0.5, part by weight to 1 part by weight of gelatine.

Gelatine, which has been plasticized by the addition of the copolymer dispersion, can be modified in the usual manner using other additives such as high molecular weight water-soluble and water-insoluble compounds. The following are mentioned as examples of high molecular weight water-soluble compounds: polyvinyl pyrrolidone, polyvinyl methyl ether, polyvinyl alcohol, polyacrylic acid and polymethacrylic acid, polymaleic acid, polystyrene sulphonic acid, polyvinyl sulphonic acid and any copolymers of these compounds; furthermore, natural substances such as gum arabic, dextranes, laevanes and other soluble polysaccharides and their derivatives may be used provided that they do not contain any cationic groups.

Examples of water-insoluble compounds which may be added are synthetic resin lattices of polyacrylic acid esters and their copolymers and polyvinyl ethers and their copolymers, provided that these compounds are compatible with gelatine. Furthermore, the copolymer dispersions may be advantageously combined with dispersions of water-insoluble polyethers of the type described in British Pat. specification No. 1,053,568 or with dispersions of other water-insoluble compounds which have a boiling point above 250° C.

The plasticizers according to the invention are particularly easy to use in color emulsions which contain conventional water-soluble dye components of fatty acid residues. The dispersions are readily compatible with the aqueous solutions of the dye components. Mixtures of plasticizers and dye components can easily be prepared, and then one has only one solution of additives instead of two. Separation of the components by flocculation does not occur even under the most extreme conditions, such as drying the layers using heat at temperatures above the melting point.

The gelatin layers obtained according to the present invention are less brittle than similar layers produced without the additive, and they have less tendency to curl up, but nevertheless they adhere firmly to their support. The photographic properties are practically unchanged. Eogging and reduction in sensitivity do not occur. In many cases, a reduction in the basic fogging, after storage of the samples in a heating cupboard, is observed.

The conventional casting additives such as hardeners, wetting agents, optical sensitizers, development catalysts and additives for increasing the silver covering power in highly sensitive black-white emulsions, need not be altered as they are not affected by the copolymer dispersions. The plasticizers are equally suitable for both film emulsions and paper emulsions and for gelatine-containing protective and photographic layers.

EXAMPLE 1

65 g. of:
1. an aqueous dispersion of copolymer 2
2. an aqueous dispersion of copolymer 3
3. an aqueous dispersion of copolymer 5 are added in each case to 1 kg. of a silver chlorobromide gelatine which is ready for casting and which contains about 65 g. of gelatine. These copolymer dispersions have a solids content of 30 percent. The mixtures are thoroughly stirred during the addition. Other casting additives such as hardeners, development catalysts, wetting agents, etc., are added thereafter. The casting solutions are poured on a support of triacetyl cellulose and dried. The films obtained are exposed and developed before and after 3 days storage in a heating cupboard at 60° C. The developer bath has the following composition:

1 g. of p-methylaminophenol
13 g. of sodium sulphite sicc.
1.8 g. of hydroquinone
4.6 g. of soda sicc.
1.6 g. of potassium bromide
water up to 1 liter.
Development time: 11 minutes.

After fixing in an acid fixing bath and 25 minutes washing, the film is dried.

The films obtained show no fogging and have the same sensitivity as test films which have been processed in the same way but which contain no softening additive. The films lie flat and show practically no signs of curling up after they have been stored in a heating cupboard at 50° C. They are firmly bonded to their support.

EXAMPLE 2

Thirty percent of copolymers 2 to 5 in latex form, based on the amount of gelatine, are added with vigorous stirring to separate parts of a mixture of 1 liter of a photographic emulsion which contains
35 g. of silver bromide and
80 g. of gelatine.

Twenty-four g. of 1-hydroxy-4-sulpho-2-naphthoic acid heptadecylamide are then added as the dye component. It is not necessary to observe the given sequence when adding the softener and the dye component. The dye component may also be mixed with the dispersion of the plasticizer and these two materials may be added to the emulsion together. The individual mixtures are poured on a prepared layer support of cellulose triacetate after the usual casting additives such as hardeners (30 cc. of 5 percent tris-acryloylhydrotriazine solution) and wetting agent (12 ml. of 10 percent saponin solution) have been added, and the resulting layers are dried at room temperature. The thickness of the layers is uniformly 18 $\mu$. Sample strips 1.5 cm. in width and 30 cm. in length are stamped out of the film sheetings. After color processing for negative cine films in accordance with Final Fiat Report 943, page 85, these strips are acclimatized to an atmosphere of 35 and 50 percent relative humidity at 22° C. The test is in each case carried out under the atmospheric conditions indicated.

The film strips with their active surface outwards are drawn over two ball bearing deflecting rollers (roller diameter 5 mm.) which bend the film twice at right angles at a distance apart of 1.5 cm. The film is placed under tension using a weight of 1 kg. and periodically drawn over the two deflecting rollers by a cam arrangement. The film is subjected to a severe mechanical stress at each stroke and tears after a certain number of strokes. This number is automatically determined and indicates the mechanical quality of the film. The higher the number reached, the better the mechanical quality of the film. The values indicated below are average values obtained from four measurements. Only films of excellent quality have a value of 1,000. Furthermore, at values above 1,000, the brittleness of the support has a significant bearing on the measurement.

RESULTS

| Additive | Number of Strokes | |
| --- | --- | --- |
| Percentage given refers to dry weight of copolymer and gelatine | 35% relative humidity | 50% relative humidity |
| 0% | 12 | 50–60 |
| 30% latex of copolymer 2 | 290 | 1430 |

| | | |
|---|---|---|
| 30% latex of copolymer 3 | 280 | 450 |
| 30% latex of copolymer 4 | 160 | 520 |
| 30% latex of copolymer 5 | 260 | 950 |

All the lattices reduce the brittleness considerably.

EXAMPLE 3

The test is carried out on a conventional color photographic multilayered material which is made up as follows:

A layer support of cellulose triacetate which has a thickness of 130 $\mu$, a red-sensitive silver halide emulsion layer which contains 20 g. of blue-green coupler 1-hydroxy-2-naphthoic acid octadecylamide per kg. of casting solution, a green-sensitive silver halide emulsion layer, which contains 16 g. of purple coupler 1-(4'-phenoxy-3'-sulpho)-3-heptadecyl-pyrazolone-5 per kg. of casting solution, a yellow filter layer and, as the uppermost layer, a blue-sensitive silver halide emulsion layer which contains 20 g. of the yellow coupler alpha(3-stearylamino-benzoyl)-3',5'-dicarboxyacetanilide per kg. of casting solution.

The silver halide emulsion used was a silver iodobromide emulsion which contains 0.25 mol of silver bromide and 0.016 mol of silver iodide per kg. and which has a silver nitrate to gelatine ratio of 1:1.8.

Ten ml. of a 2 percent aqueous mucochloric acid solution and 20 ml. of a 10 percent aqueous saponin solution per liter of casting solution were added to the individual layers before casting. The finished layers have a thickness of 5 $\mu$.

The multilayered film built up in this way was used as comparison sample A.

The multilayered film B which was made up in an analogous manner contained in addition 30 g. of latex No. 2 per kg. of emulsion in each layer.

Samples 1.5 cm. in width and 30 cm. in length were stamped out of the film sheetings and subjected to the brittleness test without first being processed. Result:

| | Number of Strokes | |
|---|---|---|
| | 35% relative humidity | 50% relative humidity |
| Film sample A | 3 | 21 |
| Film sample B | 163 | 425 |

We claim:

1. A plasticized gelatin layer in which the plasticizer is prepared by copolymerizing by weight, (a) 9 to 30 percent ethylene, (b) 2 to 12 percent of a half ester of an $\alpha,\beta$-unsaturated dicarboxylic acid, and (c) 58 to 90 percent of a mixture of vinyl chloride and a vinyl ester of a saturated carboxylic acid, the vinyl ester being about 15 to 45 percent of this mixture by weight, the copolymer being in the form of fine particles dispersed in the layer.

2. The combination of claim 1 in which the half ester is a half ester of maleic acid and an aliphatic or cycloaliphatic alcohol containing up to eight carbons.

3. The combination of claim 1 in which the vinyl ester is an ester of an aliphatic carboxylic acid and that acid has up to five carbon atoms.

4. The combination of claim 1 in which the copolymer particles are less than 0.5 micron in size and about 0.05 to 1 part of copolymer is present for every 1 part by weight of gelatin.

5. The combination of claim 1 in which the half ester is cyclohexyl maleate and the vinyl ester is vinyl acetate.

6. A flexible support to which is adhered the layer of claim 5.

7. The combination of claim 6 in which the support is a transparent film.

8. The combination of claim 7 in which the gelatin layer is a silver halide emulsion.

* * * * *